United States Patent [19]

Spencer et al.

[11] Patent Number: 4,497,771

[45] Date of Patent: Feb. 5, 1985

[54] LOW TANTALUM CONTENT COBALT-BASE ALLOY

[75] Inventors: Robert E. Spencer; Donald L. Clarke, both of Newark, Ohio

[73] Assignee: Owens-Corning Fiberglas Corporation, Toledo, Ohio

[21] Appl. No.: 472,702

[22] Filed: Mar. 7, 1983

[51] Int. Cl.³ .............................................. C22C 19/07
[52] U.S. Cl. ................................ 420/440; 65/374.12; 420/586
[58] Field of Search ............... 420/436, 440, 588, 586; 148/425, 442; 65/1, 15, 374.12

[56] References Cited

U.S. PATENT DOCUMENTS 3,933,484  1/1976  Costin .................................. 420/588

Primary Examiner—R. Dean
Attorney, Agent, or Firm—Ronald C. Hudgens; Patrick P. Pacella

[57] ABSTRACT

A cobalt-base alloy, particularly suitable for the fabrication of glass spinners and containing up to about 1.2 weight percent tantalum is disclosed.

10 Claims, No Drawings

LOW TANTALUM CONTENT COBALT-BASE ALLOY

BACKGROUND OF THE INVENTION

This invention relates to low tantalum content cobalt-base alloys.

In one of its more specific aspects this invention relates to articles made from such alloys, particularly articles made by casting.

In certain industrial applications, there is a need for alloys which possess high rupture strength and high oxidation resistance at high temperatures. Among such applications are those involved, for example, in the glass fiber industry, where filaments are produced by passing a molten material, for example, glass, through the foraminous walls of a chamber adapted for rotation at high speeds, the chamber being known as a spinner, the filaments being emitted through the apertures of the wall due to the centrifugal action to which the molten material is subjected upon rotation of the spinner. Such spinners are usually operated when spinning glass fibers at temperatures of about 2,050° F. and rotational speeds of about 1,700 RPM. Under these conditions, the alloy of this invention has been found to possess superior stress-rupture and creep properties and superior resistance to the molten glass environment to which it is subjected.

One of the best materials known for use in such applications is that defined and claimed in U.S. Pat. No. 3,933,484 issued Jan. 20, 1976. That alloy contains on a weight basis from about 1.4 to about 6.5 percent tantalum. However, tantalum is very expensive and because significant quantities of tantalum are lost during the preparation of the alloy, amounts greater than the defined amounts must be used in achieving the ultimately desired tantalum content in the final alloy. This invention is directed to the solution of that problem.

STATEMENT OF THE INVENTION

According to this invention there is provided a composition of matter possessing the following approximate composition, the various components of this composition being expressed on a weight percent basis:

| Element | Approximate Composition, Weight % |
| --- | --- |
| Chromium | About 25. to about 36. |
| Nickel | About 3.5 to about 13. |
| Wolfram | About 3. to about 10.5 |
| Tantalum | About 0 to about 1.2 |
| Zirconium | About 0.005 to about 0.2 |
| Silicon | About 0.05 to about 2. |
| Carbon | About 0.35 to about 0.95 |
| Boron | About 0.001 to about 0.1 |
| Iron | About 0.01 to about 12. |
| Cobalt | Balance |

In the above composition, the weight ratio of zirconium to boron will be within the range of from about 0.05 to about 35.

The preferred composition of this invention will be approximately as follows, on a weight percent basis:

| Element | Approximate Composition, Weight % |
| --- | --- |
| Chromium | About 28.5 to about 33. |
| Nickel | About 9.5 to about 11. |
| Wolfram | About 5.5 to about 8. |
| Tantalum | About 0.8 to about 1.2 |
| Zirconium | About 0.009 to about 0.025 |
| Silicon | About 0.25 to about 0.7 |
| Carbon | About 0.5 to about 0.65 |
| Boron | About 0.01 to about 0.035 |
| Iron | About 0.25 to about 0.6 |
| Cobalt | Balance |

In the preferred composition, the weight ratio of zirconium to boron will be within the range of from about 0.25 to about 0.9.

The best mode of practicing the invention is represented by the following approximate composition on a weight percent basis:

| Element | Approximate Composition, Weight % |
| --- | --- |
| Chromium | About 31.2 |
| Nickel | About 10.4 |
| Wolfram | About 6.5 |
| Tantalum | About 0.8 to 1.0 |
| Zirconium | About 0.01 |
| Silicon | About 0.38 |
| Carbon | About 0.58 |
| Boron | About 0.03 |
| Iron | About 0.32 |
| Cobalt | Balance |

In the above composition, the weight ratio of zirconium to boron will be about 0.3.

The above compositions are not meant to preclude the presence of impurities which are inherently contained in the principal components previously set forth. However, these impurities should be limited to about 0.1 weight percent aluminum, about 0.1 weight percent titanium, about 0.015 weight percent sulfur and about 0.015 weight percent phosphorous.

Suitable tantalum contents, in weight percent, have also been found to be in the ranges of about 0.8 to about 1.1, and about 0.5 to about 1.2.

Particularly suitable tantalum contents in weight percent have been found to be 0.9, 1.0 and 1.2.

DETAILED DESCRIPTION OF THE INVENTION

The compositions of this invention can be prepared by air melting and air casting or by vacuum melting and vacuum casting according to recognized melt procedures for cobalt-base alloys, sometimes known as superalloys. Preferably the melt components are used in the form of master alloys to facilitate the melting of the high melting point elements such as wolfram, tantalum, chromium, zirconium, carbon and boron.

In the preferred method of producing the alloy, the original melt formed in the crucible will consist principally of chromium and cobalt. Thereafter, the remainder of the elements required can be introduced into the original melt in any order when the melt temperature is within the range of from about 2,700° F. to about 2,800° F. As an alternate, however, all components of the composition can be introduced into the crucible with the cobalt and chromium. Inasmuch as zirconium and boron are contained in the composition in minimal amounts and certain weight ratios have been indicated desirable, it is preferred that the zirconium, boron, wolfram and tantalum be introduced into the melt immediately prior to pouring in order to prevent either the oxidation of these latter materials or their loss from the crucible. After the addition of these latter materials, the melt is heated to a temperature within the range of from about 2,800° F. to about 3,025° F. to produce a uniform composition at which temperature the melt is poured. The resulting castings can be welded and machined by conventional techniques. Preferably, the cast alloy will be heated at 1,950° F. for three hours and then air cooled prior to further operations.

The following demonstrate the properties of this alloy as compared with that alloy defined in U.S. Pat. No. 3,933,484.

| Specimen | Tantalum, Wgt. % | Stress Rupture Life, Hrs. At 2100° F. & 3000 psi | Creep Rate $(HR^{-1})$ |
|---|---|---|---|
| A | 1.4 | 30.0 | $7.7 \times 10^{-4}$ |
| B | 1.2 | 31.8 | $6.0 \times 10^{-4}$ |
| C | 1.0 | 33.4 | $1.0 \times 10^{-3}$ |
| D | 0.9 | 34.7 | $4.1 \times 10^{-4}$ |

These data appear to indicate an improvement in rupture life with decreasing tantalum content. Rather, they indicate that the alloy of the present invention (B, C & D) is as good as the alloy of the prior art (A) since, when experimental error is considered, the above data more correctly are interpreted as indicating that reducing the tantalum content, in actuality, has neither a positive or negative effect on the properties indicated.

The data set forth, above, for the alloy of the prior art represents the use of recycled alloy in use for a period of years. In contrast, the comparative data set out in the 3,933,484 patent were developed using pristine materials. Hence, the data presented here are on a different basis but in no way represent a derogation of the qualities of the alloy as set forth in the patent.

One of the many types of cast articles which can be fabricated employing the alloy of this invention is a spinner. The spinner is fabricated in its entirety of the alloy of this invention.

The spinner is comprised of an upper wall having an opening therein and a lower wall having an opening therein. A continuous peripheral side wall extends between the upper wall and the lower wall to form a substantially circular chamber. The side wall is adapted with apertures which penetrate the side wall and through which molten glass, introduced into the spinner through the opening in the upper wall, is discharged.

As may apply in some spinner types, the opening in the upper wall can be adapted with a flange for connection to means for rotating the spinner. The spinner can also be adapted with an opening in the lower wall for the extension therethrough of fluid introductory means.

It will be evident from the foregoing that various modifications can be made to this invention. Such, however, are considered to be within the scope of this invention.

We claim:

1. A composition of matter consisting essentially of the following elements in the following amounts expressed in weight percent:
   Chromium—from about 25 to about 36,
   Nickel—from about 3.5 to about 13,
   Wolfram—from about 3 to about 10.5,
   Tantalum—up to about 1.2,
   Zirconium—from about 0.005 to about 0.2,
   Silicon—from about 0.05 to about 2,
   Carbon—from about 0.35 to about 0.95,
   Boron—from about 0.001 to about 0.1,
   Iron—from about 0.01 to about 12,
   Cobalt—balance,
the weight ratio of zirconium to boron being within the range of from about 0.05 to about 35.

2. The composition of claim 1 in which the tantalum content in weight percent is from about 0.8 to about to about 1.2.

3. The composition of claim 1 in which the tantalum content in weight percent is from about 0.8 to 1.0.

4. The composition of claim 1 in which the tantalum content in weight percent is from about 0.8 to about 1.1.

5. The composition of claim 1 in which the tantalum content in weight percent is from about 0.5 to about 1.2.

6. The composition of claim 1 in which the tantalum content is about 0.9 weight percent.

7. An article of manufacture produced by casting the composition of matter defined in claim 1 or claim 2.

8. An article of manufacture produced by casting the composition of matter defined in claim 3 or claim 4.

9. An article of manufacture produced by casting the composition of matter defined in claim 5 or claim 6.

10. A spinner comprised of the composition of claim 1, said spinner being comprised of foraminous walls and adapted for rotation.

* * * * *